United States Patent [19]

Tscharner et al.

[11] 3,925,260
[45] Dec. 9, 1975

[54] CRYSTALLINE FORMS OF 4,4-BIS-TRIAZINYLAMINOSTILBENE DERIVATIVES AND PROCESSES FOR MAKING SAME

[75] Inventors: Christopher Johannes Tscharner, Warwick; Maurice Jacob Schwarz, Cranston, both of R.I.; Paul Horlacher, Mohlin, Switzerland

[73] Assignee: Ciba-Geigy Corporation, Ardsley, N.Y.

[22] Filed: Aug. 17, 1973

[21] Appl. No.: 389,416

Related U.S. Application Data

[63] Continuation of Ser. No. 195,494, Nov. 3, 1971, abandoned, which is a continuation of Ser. No. 814,562, April 9, 1969, abandoned.

[52] U.S. Cl.......... 252/543; 252/301.2 W; 252/524; 260/240 B
[51] Int. Cl.$^2$.................. C11D 3/42; C07D 251/68
[58] Field of Search......... 260/240 B; 252/543, 542, 252/524, 301.2 W

[56] References Cited
UNITED STATES PATENTS 3,272,805   9/1966   Hausermann et al............... 252/543
3,472,842   10/1969  Hausermann et al............... 260/240

FOREIGN PATENTS OR APPLICATIONS 1,219,940   6/1966   Germany........................... 260/240

*Primary Examiner*—Herbert B. Guynn
*Attorney, Agent, or Firm*—Joseph G. Kolodny; Edward McC. Roberts; Prabodh I. Almaula

[57] ABSTRACT

For incorporation in detergents as optical brighteners, crystalline forms of the disodium salts of N,N'-bis-[4-anilino-6-(ω-alkoxyalkylamino)-1,3,5-triazin-2-yl]-4,4'-diaminostilbene-2,2'-disulfonic acids having characteristic X-ray diffraction diagrams, are produced by converting yellow amorphous forms of the above compounds by crystallization from an aqueous solution having a pH higher than 7 and containing approximately 1.0 – 2.5 volume percent of a water-soluble electrolyte and the amorphous form at certain temperatures, or through heating and then cooling a mixture having a pH higher than 7 containing the amorphous form, water, a water-soluble electrolyte, and an inert water-soluble organic solvent.

2 Claims, 4 Drawing Figures

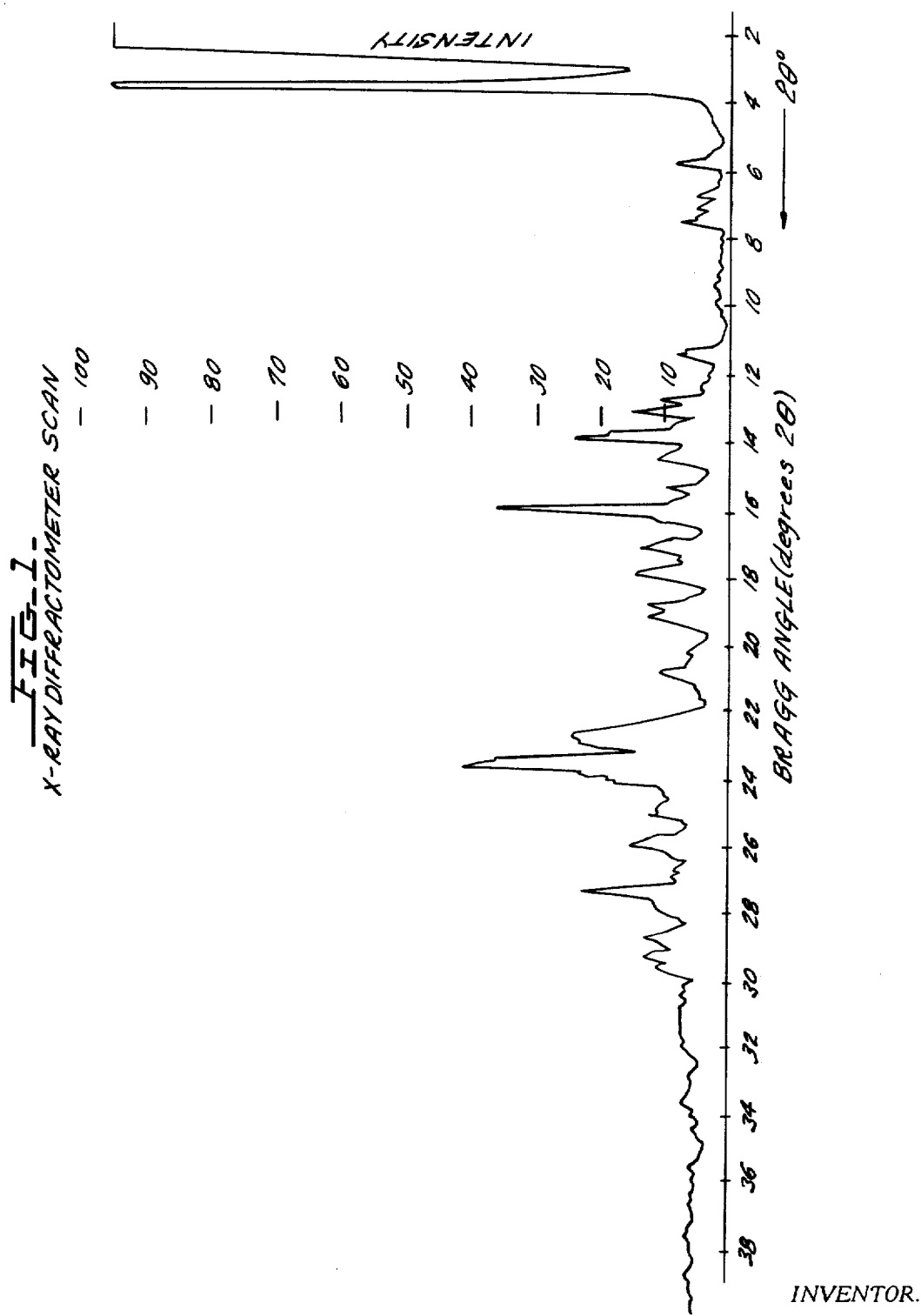

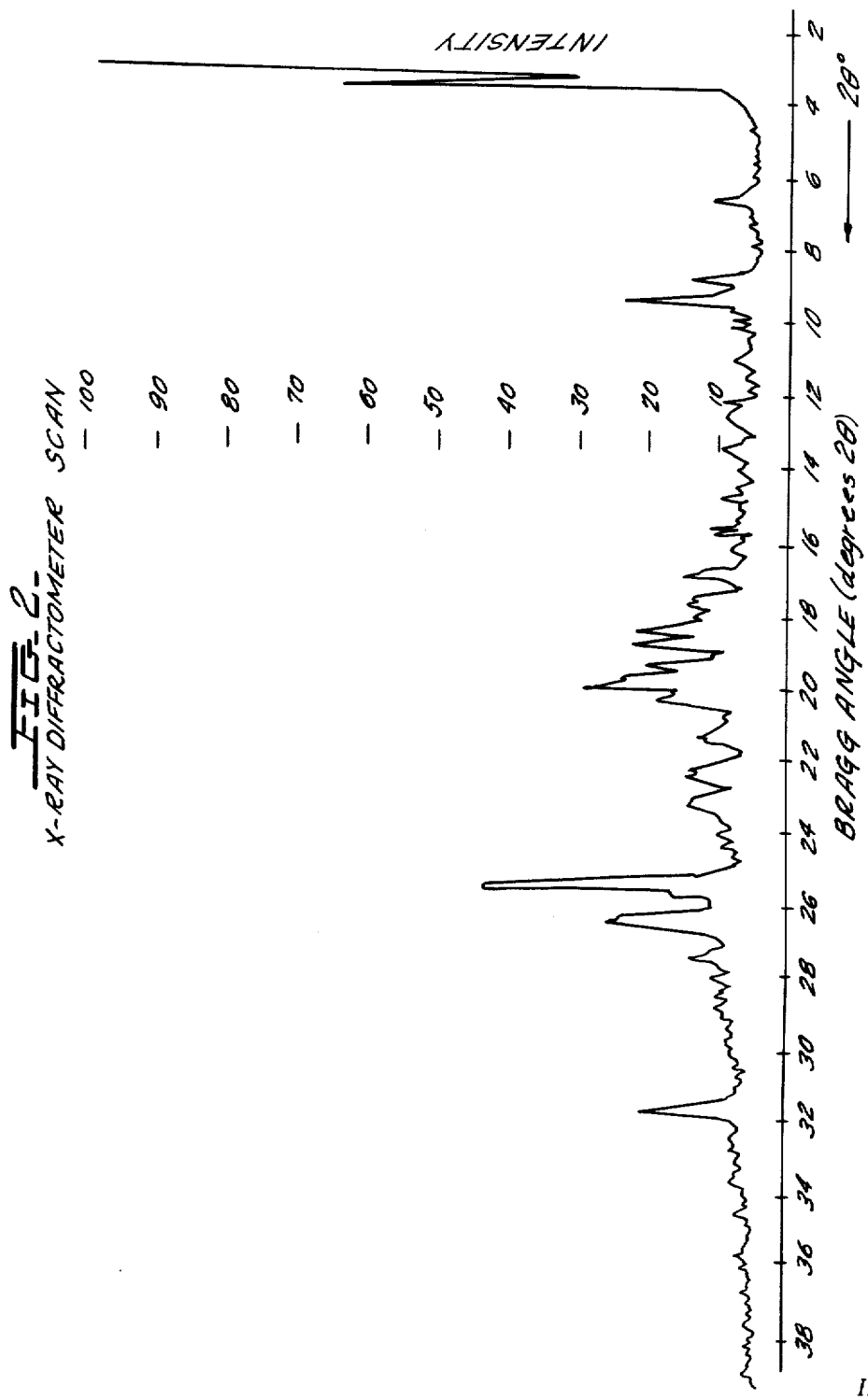

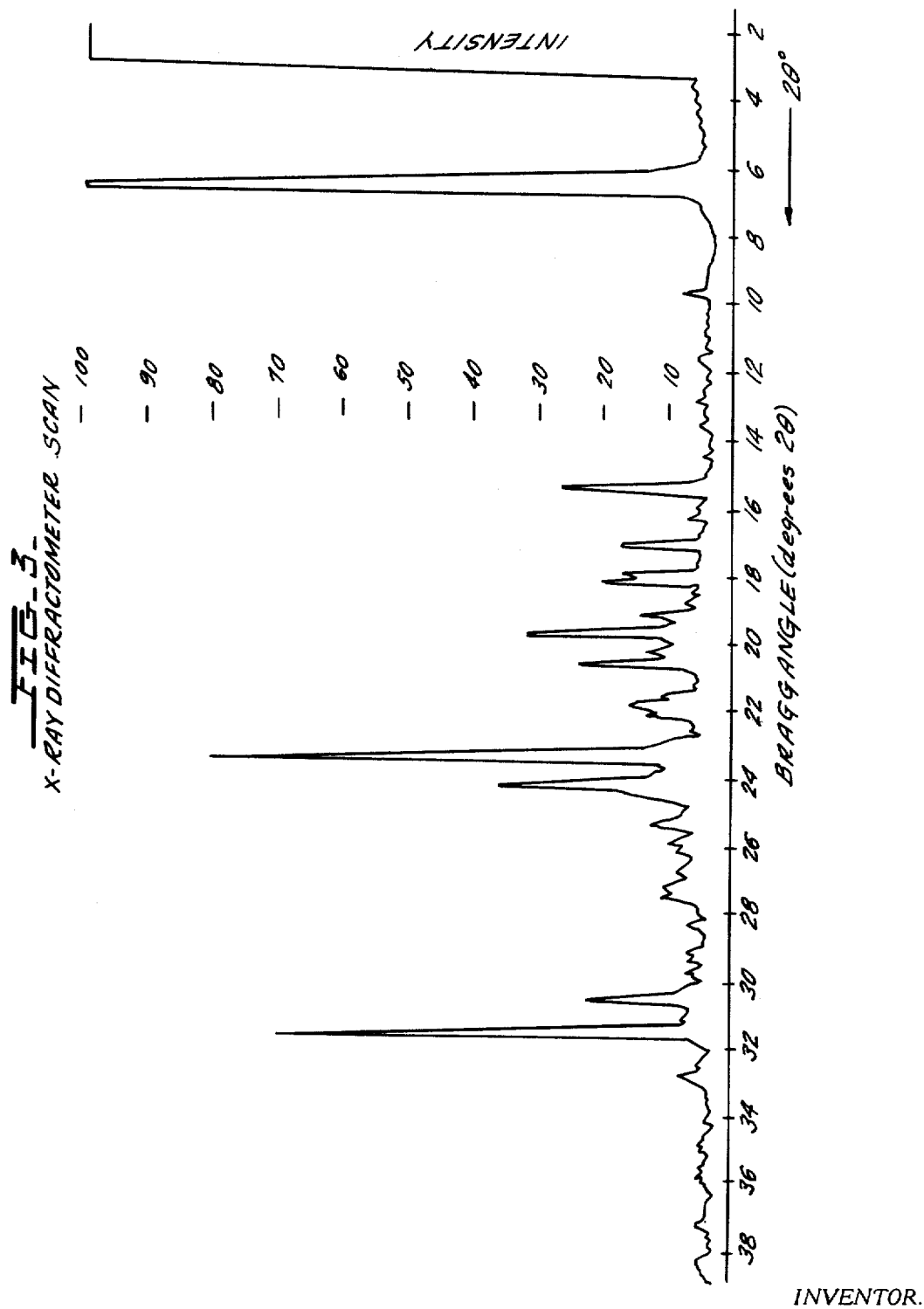

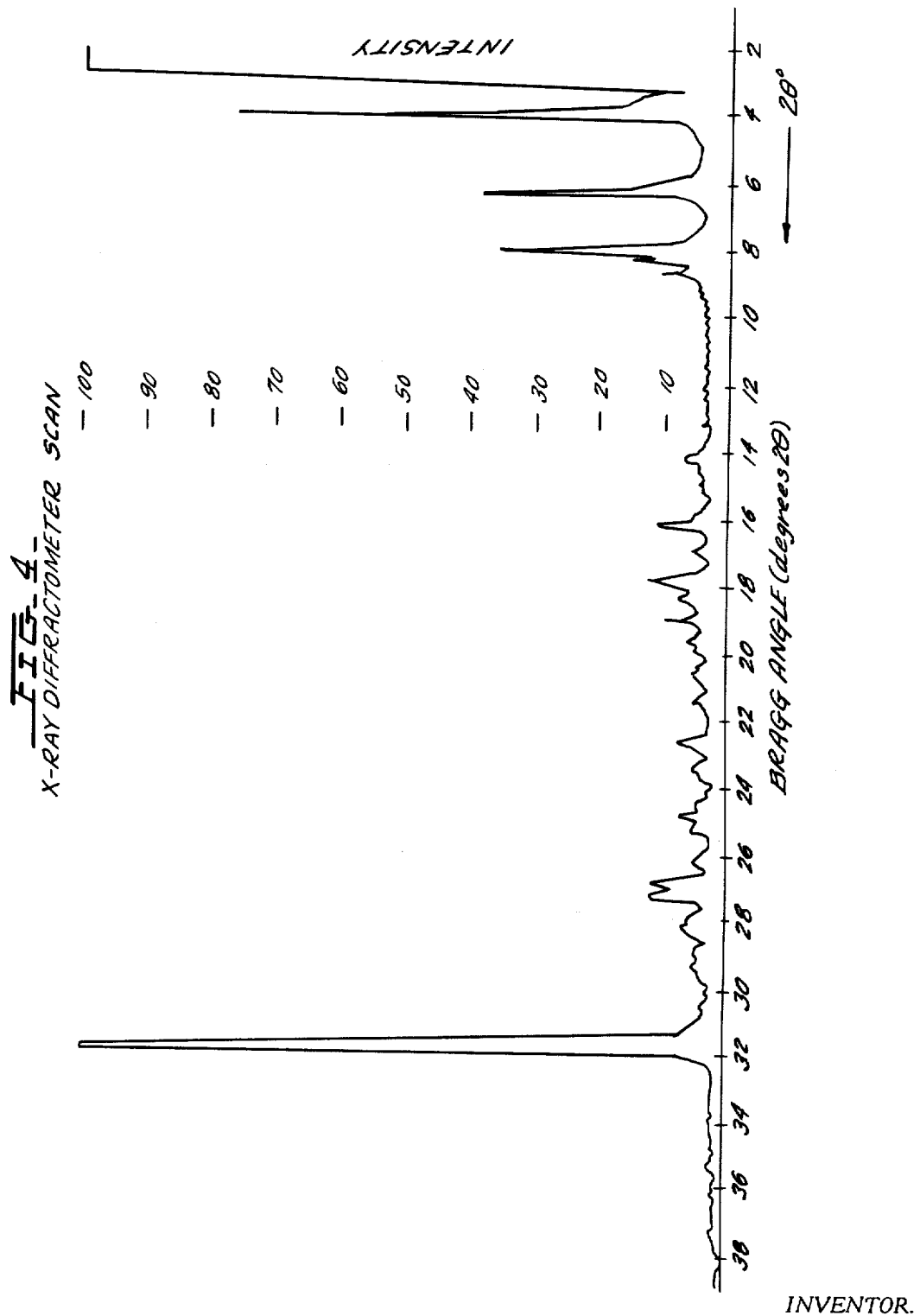

CRYSTALLINE FORMS OF 4,4-BIS-TRIAZINYLAMINOSTILBENE DERIVATIVES AND PROCESSES FOR MAKING SAME

This is a continuation of application Ser. No. 195,494, filed on Nov. 3, 1971, which in turn is a continuation of application Ser. No. 814,562, filed on Apr. 9, 1969 both now abandoned.

DETAILED DISCLOSURE

The present invention pertains to new crystalline forms of the disodium salt of N,N'-bis-[4-anilino-6-(ω-alkoxyalkylamino)-1,3,5-triazin-2-yl]-4,4'-diaminostilbene-2,2'-disulfonic acid and to processes for the preparation of such products and their use as optical brighteners in detergents.

Optical brighteners of the formula:

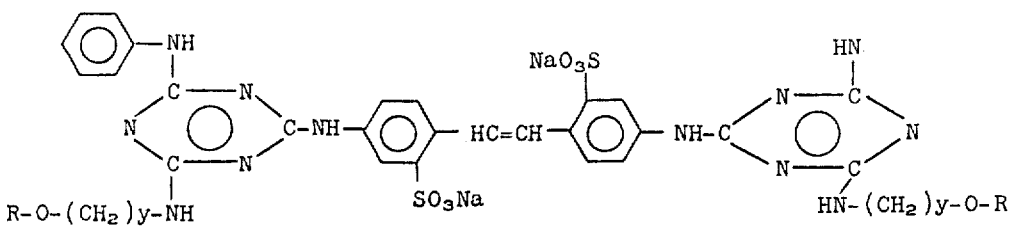

(I)

wherein
R is alkyl of from 1 to 2 carbon atoms and
y is an integer of from 2 to 3
are known, for instance, from Swiss Pat. No. 386,436 and U.S. Pat. No. 3,272,805.

The products obtained according to the known processes are yellow and amorphous; they are readily soluble in water and can easily be incorporated into detergents. However, these amorphous products still contain impurities and products of side reactions. Such impurities and by-products are detrimental; they can be removed — if at all — only by extensive work-up procedures which also entail the loss of the desired product.

According to the present invention, it is now surprisingly possible to produce crystalline forms of the compounds of formula I, which show less water-solubility and accordingly can be prepared as very pure products. The crystalline forms of this invention give better optical brightening effects than equal amounts of the known amorphous, crude compounds. Furthermore, greater maximal brightening effect can be achieved and in the case of the products of Formula Ib below the product itself is white compared to the generally yellowish color of the amorphous form. This feature is especially advantageous in detergents since no unwanted color shades are thus imparted to the detergent powder by the brightener.

These new crystalline products of the formula I compounds have specific X-ray diffraction diagrams.

In one aspect, the crystalline products according to the present invention have the following formula:

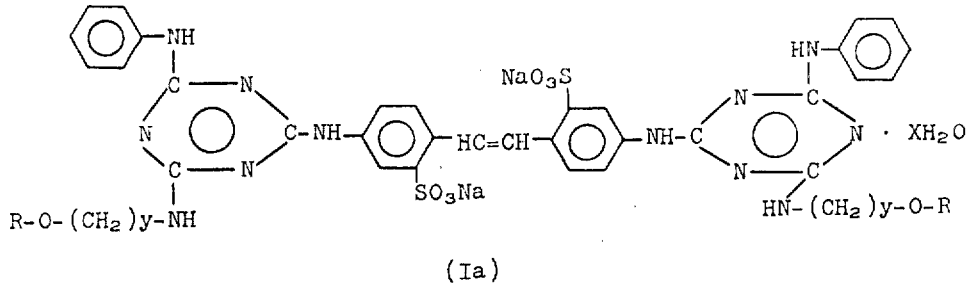

(Ia)

wherein
R is alkyl of from 1 to 2 carbon atoms,
y is an integer of from 2 to 3 and
X is approximately 7.

The crystalline products of formula Ia, called the α-forms, are obtained by crystallization from an aqueous, electrolyte-containing solution of a compound of formula I. The solution has a pH higher than 7 and the temperature is maintained between 20° and 70°C, preferably between 45° and 55°C. In order to shorten the period for crystallization, it is advisable to add seed crystals. The preferred electrolyte is the sodium salt of a mineral acid, especially sodium chloride. The amount of electrolyte employed ranges from 1.0 to 2.5% by volume and is preferably 1.5 to 2.0%.

Since the new crystalline forms are only slightly water-soluble, they are obtained in good yields and are very pure. Impurities such as, poly-4,4'-diaminostilbene-2,2'-disulfonic acid, hydroxy-, tetraalkanolamino-, and trialkanolamino compounds, all of which are formed during the preparation of compounds of formula I, remain dissolved and can be removed easily by washing.

The pure, crystalline products can be dried in vacuo at 25°–35°C without changes in crystal form. If the freshly prepared products of formula Ia are dried between 40° and 80°C, there is a change in crystal forms through loss of crystal water, but this process is reversible by subsequent absorption of water. On heating the products of formula (Ia at temperatures above 100°C, an amorphous form is obtained which cannot be reconverted into a crystalline form by absorption of water. This amorphous form which is obtained, however, is suitable for incorporation into textile detergents due to its weaker color as opposed to less pure amorphous forms.

Alternatively, other crystalline forms, called the β-forms, with less crystal water can be obtained by crystallizing from a mixture consisting of water, a water-soluble electrolyte, an inert and at least partially water-soluble organic solvent, and a compound of formula I, which mixture has a pH higher than 7, by heating to reflux, and then distilling off the organic solvent. A product of the following formula crystallizes in the form of thermostable crystals, and is called the β-form:

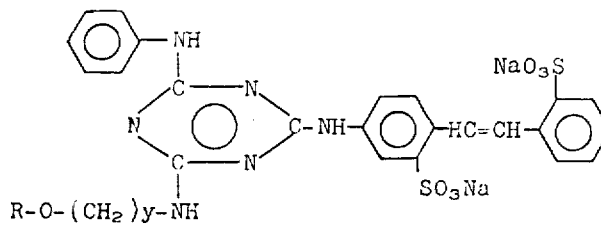

(Ib)

wherein

R is alkyl of from 1 to 2 carbon atoms,
y is an integer of from 2 to 3 and
X' is either 1 or 2.

It is also advantageous to accelerate the crystallization in this process with seed crystals. Preferred organic solvents are ketones, for example, acetone, and preferably methylethylketone. The preferred water-soluble electrolyte is a sodium salt of a mineral acid, preferably sodium chloride. The concentration of the electrolyte is preferably 23–35%, by weight, calculated on the amount of water. The mixture is preferably heated to boiling under reflux and is kept at this temperature for a period of time, generally from about one to two hours. The organic solvent is then removed by distillation.

The crystalline products prepared in accordance with either of the two above-described processes show good afinity to cellulose fibers upon application by the usual methods. They draw onto the fibers at low temperatures, i.e. temperatures between about 35°–60°C and are, therefore, suitable for the household laundry.

Of particular importance are the crystalline products of formula I$a$ (the α-forms) and I$b$ (the β-forms) wherein R is methyl and y is 2 or 3.

FIGS. 1–4 are X-ray diffraction diagrams of the preferred crystalline forms, respectively, of formula I$a$ where R is methyl, X is 7 and y is 3 and 2 and formula I$b$ where R is methyl, X' is 1, and y is 3 and 2. The above-described preferred species of formulas I$a$ and I$b$ are set out below as formulas II–V.

The X-ray diffraction diagrams characteristic of these products are produced by means of a counter goniometer made by Philips, Eindhoven, using CuK$_\alpha$ radiation. The instrument records the intensity of the diffracted ray along the vertical axis in relation to the diffraction angle $2\theta$. The interplanar spacings $d$ are subsequently calculated in Ångström from the diffraction angles by using the Bragg equation $n \cdot \lambda = 2d \cdot \sin \theta$. The accuracy is to about 0.1°. This should be taken into consideration in the interpretation of the data.

The crystalline form of the compound of formula II, the α-form,

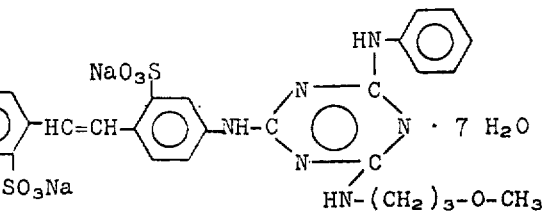

(II)

is characterized by the X-ray diffraction diagram of FIG. 1 which shows the following characteristic lines: a very strong line at $2\theta = 3.9°$ and two fairly strong lines at 16.23° and 23.85°.

The crystalline form of the compound of formula III, the α-form,

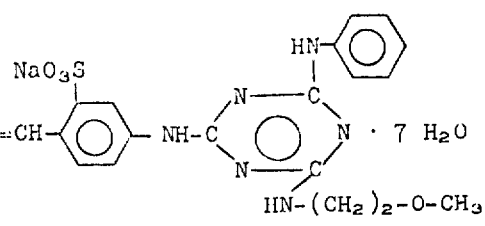

(III)

is characterized by the X-ray diffraction diagram of FIG. 2 with the following characteristic lines: a strong line at 2 θ = 3.42° and four fairly strong lines at 9.38°; 20.0°; 25.5°1 and 26.42°.

The crystalline form of the compound of formula IV, the β-form, by addition of sodium hydroxide solution. After the reaction has been completed, the reaction mixture is cooled to 50°C. The reaction mixture contains crude disodium salt of N,N'-bis-[4-anilino-6-(3-methoxy propylamino)-1,3,5-triazin-2-yl]-4,4'-diaminostilbene-2,2'-disulfonic acid.

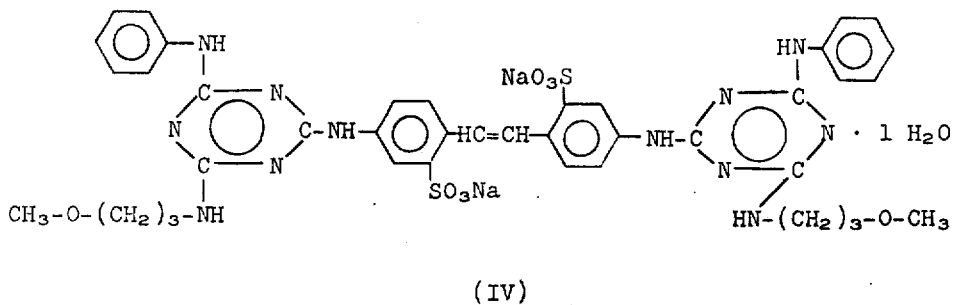

(IV)

is characterized by the X-ray diffraction diagram of FIG. 3 with the following characteristic lines: a very strong line at 2 θ = 6.48°, a strong line at 23.39° and two fairly strong lines at 19.72° and 24.2°.

The crystalline form of the compound of formula V, the β-form, b. Water is added to the inhomogeneous reaction mixture containing the crude disodium salt of N,N'-bis-[4-anilino-6-(3-methoxy propylamino)-1,3,5-triazin-2-yl]-4,4'-diaminostilbene-2,2'-disulfonic acid until a sodium chloride concentration of 1.5% by volume is obtained. Seed crystals of the same product containing 7

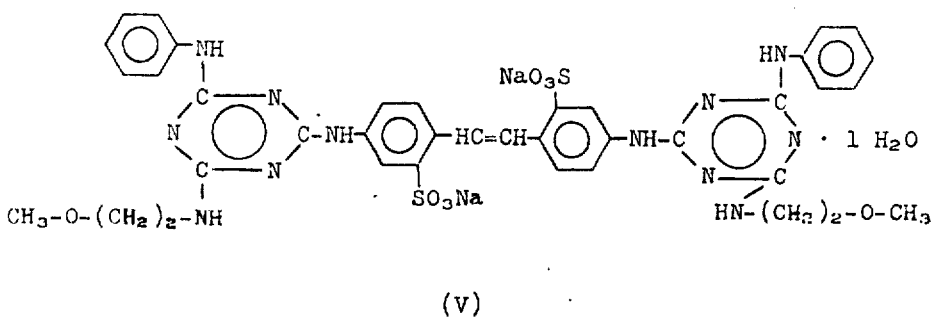

(V)

is characterized by the X-ray diffraction diagram of FIG. 4 with the following characteristic lines: a strong line at 2 θ = 4.0° and two fairly strong lines at 6.25° and 8.04°.

The following examples are given by way of illustrating the invention without limiting the scope thereof in any way.

EXAMPLE 1 a. A suspension of 100 g of cyanuric chloride in a mixture of 300 ml of water and 700 g of ice is prepared. 1200 ml of an aqueous solution containing 100 g of 4,4'-diaminostilbene-2,2'-disulfonic acid sodium salt and 29 g of sodium carbonate are slowly added while stirring within 1 to 3 hours at a temperature of 0 to 5°C and the reaction mixture is subsequently stirred for another few minutes. Then, 50 g of aniline are added and the pH of the reaction mixture adjusted to 7 to 9 by means of a sodium hydroxide solution keeping the temperature at 2-25°C. After the substitution reaction is terminated, which is evident from a negative reaction for aniline, for example, by diazotization, i.e. after about 1 hour, 58 g of 3-methoxy propylamine are added and the reaction mixture is heated to boiling. The pH value of the reaction mixture is kept at 10 to 11 moles of crystal water per mole of product are added and the reaction mixture stirred at 45°-55°C until the crystallization which starts immediately is completed. Then the mixture is cooled to 20 to 35°C. The crystals are removed by filtration and washed with 1.5% by volume sodium chloride solution. After drying, pure white crystals of the compound of the α-form, are obtained. The yield is 91% of the theory. The product is suitable for incorporation into textile detergents.

A product almost as pure as the one obtained above is also obtained when the crystals are carefully filtered off by suction and are not washed with a sodium chloride solution.

EXAMPLE 2 a. A suspension is prepared from 100 g of cyanuric chloride, 300 ml of water and 700 g of ice. To this suspension are slowly added 1200 ml of an aqueous solution of 100 g of 4,4'-diaminostilbene-2,2'-disulfonic acid sodium salt and 29 g of sodium carbonate at a temperature of 0°-5°C with stirring. Subsequently, 50 g of aniline are added and the reaction mixture is adjusted to a pH of 7 to 9 by means of a sodium hydroxide solution keeping the temperature between 2 and 25°C. After the substitution is completed, 58 g of 3-methoxy propylamine are added and the reaction mixture is heated to boiling. The pH of the reaction mixture is kept at pH 10–11 by means of a sodium hydroxide solution; reaction is completed, the reaction then, after the mixture is cooled to 60° to 65°C. The highly concentrated, aqueous solution of the optical brightener is separated from the top brine layer and is dissolved in 1800 ml of water at 50°C. The reaction mixture is then filtered. The clear filtrate is slowly added to a mixture of 600 g of sodium chloride and 400 ml of water which is at a temperature of 50°C. The amorphous form of N,N'-bis-[4-anilino-6-(3-methoxy propylamino)-1,3,5-triazin-2-yl]-4,4'-diaminostilbene-2,2'-disulfonic acid disodium salt is filtered off and is used for the following step.

b. Moist or dry, crude, amorphous N,N'-bis-[4-anilino-6-(3-methoxy propylamino)-1,3,5-triazin-2-yl]-4,4'-diaminostilbene-2,2'-disulfonic acid disodium salt is dissolved in 2000 ml of water. The sodium chloride concentration is adjusted to between 1.0% to 1.2% by volume. Seed crystals of the above-described compound having 7 moles of water incorporated per mol are added and the reaction mixture is stirred at 45°–55° until crystallization is completed after about 3 to 8 hours. The mixture is cooled to 20°–35°, the crystals separated by filtration and washed with 1.5% by volume of sodium chloride solution. After drying, pure, white crystals of the compound of formula II, the α-form, are obtained in a 89% yield.

Relatively pure crystals are also obtained when the crystals are carefully filtered off by suction but are not washed with a sodium chloride solution.

EXAMPLE 3

The starting solution containing crude N,N'-bis-[4-anilino-6-(3-methoxy propylamino)-1,3,5-triazin-2-yl]-4,4'-diaminostilbene-2,2'-disulfonic acid disodium salt is obtained by separation of the highly concentrated aqueous reaction solution containing the crude product from the top brine layer as outlined in Example 2a. The highly concentrated solution is poured into 1800 ml of water of 50°C and clarified. 30 g of sodium sulfate are added, and the solution obtained is used as starting material for the following step.

The solution obtained is treated as described in Example 1b. Pure, white crystals of the compound of formula II, the α-form, are obtained in 90% yield.

EXAMPLE 4 a. A suspension is prepared from 100 g of cyanuric chloride, 300 ml of water and 700 g of ice. A solution of 100 g of 4,4'-diaminostilbene-2,2'-disulfonic acid sodium salt in 800 ml of water is slowly added while stirring at a temperature of 0°–5°C keeping the pH value at between 4 and 6 by simultaneously adding a 15% by volume of sodium carbonate solution. Subsequently, 50 g of aniline are added at a temperature of between 2°C and 25°C and the pH is adjusted to 7 to 9 by means of a sodium hydroxide solution. After substitution is completed, 49 g of 2-methoxy ethylamine are added and the reaction mixture is heated to boiling. The pH value is adjusted to 10 to 11 by means of a sodium hydroxide solution. The reaction mixture is cooled to 50°C and is used as starting material for the following step.

b. To the inhomogeneous, aqueous reaction mixture of (a) containing crude N,N'-bis-[4-anilino-6-(2-methoxy ethylamino)-1,3,5-triazin-2-yl]-4,4'-diaminostilbene-2,2'-disulfonic acid disodium salt water is added until a sodium chloride concentration of 2.0% by volume, is obtained. Seed crystals of the compound containing 7 moles of crystal water per mol of compound are added and the reaction mixture is stirred at 45°–55° until the starting crystallization which starts immediately is completed. The mixture is cooled to 20°C to 35°C and the crystals are filtered off. After drying, pure, yellow crystals of the compound of formula III, the α-form, are obtained in a yield of 91% of the theory.

On heating this product to a temperature above 100°C a water-free, amorphous product is obtained which is suitable for incorporation into textile detergents due to its purity and excellent water-solubility.

EXAMPLE 5 a. The starting material is prepared according to Example 4a. However, after the substitution reaction is completed, 40 g of sodium chloride are added and the reaction mixture is cooled to 60° to 65°C. The highly concentrated aqueous solution of the optical brightener is separated from the top brine layer, and is poured into 1800 ml of water of a temperature of 50°C and then clarified. The clear filtrate is slowly added to a mixture of 400 ml of water and 600 g of sodium chloride, said mixture having a temperature of 50°C. The amorphous form of the desired product is isolated and used for the next step.

b. Moist or dry, crude, amorphous N,N'-bis-[4-anilino-6-(3-methoxy ethylamine)-1,3,5-triazin-2-yl]-4,4'-diaminostilbene-2,2'-disulfonic acid disodium salt obtained as described above, is dissolved in 2000 ml of water. The sodium chloride concentration is adjusted to 2 to 2.5% by volume. Seed crystals of the above-mentioned compound containing 7 moles of crystals water per mol of compound are added and the reaction mixture is stirred at 45°C to 55°C until the crystallization which starts immediately is completed after a period of 4 to 8 hours. The mixture is cooled to 20°C to 35°C and the crystals are filtered off. After drying, pure, yellow crystals of the compound of formula III, the α-form, are obtained in a yield of 89% of the theory.

EXAMPLE 6 a. The optical brightener is prepared according to Example 4a. However, after the substitution reaction has been completed, 40 g of sodium chloride are added and the mixture is cooled to 60°C to 65°C. The crude product in form of a highly concentrated aqueous solution is separated from the top brine layer and is poured into 1800 ml of water having a temperature of 50°C. The solution is clarified and 50 g of sodium sulfate are added to the clear filtrate. The filtrate containing the desired crude N,N'-bis-[4-anilino-6-(2-methoxy ethylamino)-1,3,5-triazin-2-yl]-4,4'-diaminostilbene-2,2'-disulfonic acid disodium salt is used for the next step.

b. The reaction mixture prepared above is treated as described in Example 4b. Pure, yellow crystals of the compound of formula III, the α-form, are obtained in a yield of 90% of the theory.

EXAMPLE 7

In a 1 liter flask equipped with stirrer, thermometer, reflux condenser, and funnel tube, there is placed 50 g of amorphous N,N'-bis-[4anilino-6-(3-methoxy propylamino)-1,3,5-triazin-2-yl]-4,4'-diaminostilbene- 2,2'-disulfonic acid disodium salt, 375 g of hot water, and 160 g of methylethylketone. The mixture is heated to 70°C while stirring and the pH is adjusted to 11 with a 50% alkali hydroxide solution. 150 g of sodium chloride are added; the mixture is heated to reflux temperature (74°C) and is kept at this temperature for approximately 1 hour. By gradually raising the temperature, the methylethylketone is distilled off. At 85°C, some product precipitates in lumps which disintegrate after the complete removal of the methylethylketone, forming a highly fluid crystal slurry. When the temperature has reached 100°C and the methylethylketone has been removed, the mixture is cooled to room temperature while stirring. The product is filtered off and is washed with 500 g of a 10 % trisodiumphosphate solution and 200 g of a 20% sodium chloride solution. The liquid is removed by suction and the moist cake obtained is dried in vacuo at 100°C. 60 g pure, white crystals of the compound of formula IV, the β-form, are obtained.

This crystalline form is suitable for the incorporation into textile detergents.

EXAMPLE 8

The compound of formula V, the β-form, is prepared according to Example 7, however, instead of amorphous N,N'-bis-[4-anilino-6-(3-methoxy propylamino)-1,3,5-triazin-2-yl]-4,4'-diaminostilbene-2,2'-disulfonic acid disodium salt, N,N'-bis-[4-anilino-(2-methoxy ethylamino)-1,3,5-triazin-2-yl]-4,4'-diaminostilbene-2,2'-disulfonic acid disodium salt is used. 60 g of pure, white crystals of the compound of formula V, the β-form, are obtained. This compound is suitable for the incorporation into textile detergents.

EXAMPLE 9

A suspension of 63.75 g of cyanuric chloride in a mixture of 500 g of crushed ice and 500 g of methylethylketone is prepared in a 3 liter flask. 658 g of a 10% clear, amber disodium diaminostilbene disulfonate solution of 64 g of diaminostilbene disulfonic acid containing 18 g of sodium carbonate at 20°–25°C is added over a period of 50 minutes. The pH is maintained at 4–5 and the reaction temperature maintained below 5°C while stirring is continued for approximately 1 hour. There is then added 32.35 g of aniline. The pH is maintained at 6–7.5 by addition of a 50% solution of sodium hydroxide. The reaction is continued at about 50°C for about 1 hour. After this substitution reaction is completed, which is indicated by a negative reaction for aniline, 45 g of 65% of 2-methoxy ethylamine are added and the reaction mixture heated to 65°C and maintained at a pH of 10.5–11 by the gradual addition of the 50% solution of sodium hydroxide. The temperature is maintained at 65°C for 30 minutes. After completion of the reaction, 400 g of sodium chloride are added and the reaction mixture is heated at reflux for 1 hour. The methylethyl ketone is then distilled at 90°C, whereupon the compound of formula V, the β-form, begins to crystallize. The reaction temperature is then raised to 97°C distilling off the remainder of the methylethylketone. The mixture is then cooled to room temperature with stirring and the liquid removed and the product filtered off. The product is dried at 100°C in a vacuum. 175–185 g of pure, white crystals of the compound of formula V, the β-form, are obtained. This crystalline form is suitable for incorporation into textile detergents.

In each of the foregoing examples, the structures of the compound is confirmed by determination of X-ray diffraction patterns.

EXAMPLE 10

0.25 g Of the crystalline optical brightener of formula II obtained according to Examples 1, 2 or 3 are dissolved in 2.5 ml of 1N sodium hydroxide solution and 100 ml of water and then worked up into a homogeneous paste with 100 g of a heavy duty detergent consisting of:
  15.2 parts of sodium dodecylbenzene sulfonate,
  3.8 parts of sodium lauryl sulfate,
  25.6 parts of sodium tripolyphosphate,
  7.6 parts of tetrasodium pyrophosphate,
  4.8 parts of sodium silicate,
  1.9 parts of magnesium silicate,
  5.0 parts of sodium carbonate,
  1.4 parts of carbomethyl cellulose,
  0.3 parts of sodium salt of ethylenediamine tetra acetic acid, and
  34.4 parts of sodium sulfate The mixture is then dried at 85°C, crushed and finally pressed through a sieve.

The washing powder obtained has a high degree of whiteness and very effectively brightens a mixed load of household laundry.

EXAMPLE 11

If the procedure given in Example 10 is followed, however, replacing the 100 g of detergent by another heavy duty detergent consisting of
  7.8 parts of sodium lauryl sulfate,
  11.0 parts of sodium dodecylbenzene sulfonate,
  11.0 parts of sodium tripolyphosphate,
  16.6 parts of tetrasodium pyrophosphate,
  4.6 parts of sodium silicate,
  1.4 parts of carbomethyl cellulose,
  36.8 parts of sodium sulfate, and
  8.0 parts of sodium perborate ($NaBo_3 \cdot 4\ H_2O$) a washing agent is obtained having a high degree of whiteness.

EXAMPLE 12

A composition consisting of
  51 parts of sodium-n-dodecylbenzene sulfonate,
  24 parts of sodium xylene sulfonate,
  10 parts of nonylphenoxy polyoxyethylene ethanol,
  7 parts of lauroyl diethanol amide, and
  8 parts of water
is intimately mixed with a solution of 0.2 parts of the crystalline optical brightener of formula III described in Examples 4 to 6 in 100 parts of water and 2 parts of 1 N sodium hydroxide solution. The mixture is dried at 85°C, crushed, and finally pressed through a sieve. An excellent detergent, particularly suitable for household washing machines, is obtained.

EXAMPLE 13

A composition consisting of
  24 parts of nonylphenol polyethyleneglycolether,
  25 parts of sodium tripolyphosphate,
  5 parts of disodium phosphate,
  25 parts of sodium carbonate, and
  25 parts of sodium chloride,
is intimately mixed with 0.5 parts of the thermostable optical brightener of formula IV of Example 7 in a ribbon blender for 6 minutes. A detergent is obtained having a high degree of whiteness and which imparts a high degree of brightness to textiles washed therein.

What is claimed is:

1. A composition of matter consisting essentially of an anionic detergent and an amount sufficient to impart optical brightening thereto of the α-crystalline form of a compound having the formula:

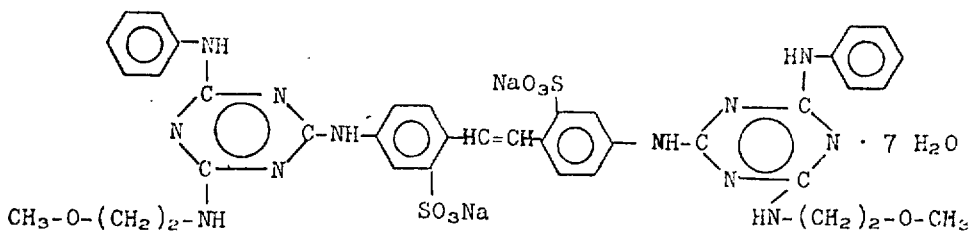

characterized by an X-ray diffraction pattern having the following characteristic lines corresponding to: a very strong line at 3.42° and four fairly strong lines at 9.38°, 20.0°, 25.5° and 26.42°.

2. A composition of matter consisting essentially of an anionic detergent and an amount sufficient to impart optical brightening thereto of the α-crystalline form of a compound having the formula:

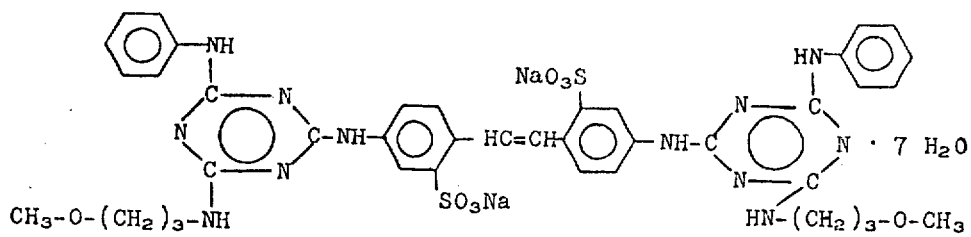

characterized by an X-ray diffraction pattern having the following characteristics lines corresponding to: a very strong line at 3.9° and two fairly strong lines at 16.23° and 23.85°.

* * * * *